United States Patent Office 3,711,505
Patented Jan. 16, 1973

3,711,505
2-(2-IMIDAZOLIN-2-YLTHIO)-ACETANILIDES
John Bernard Bream, Herts, England, Claude Wolfgang Picard, Bern, Switzerland, and David Michael Read, Herts, England, assignors to Dr. A. Wander Ltd. (also known as Dr. A. Wander AG), Bern, Switzerland
No Drawing. Filed Jan. 25, 1971, Ser. No. 109,630
Claims priority, application Switzerland, Feb. 3, 1970, 1,486/70
Int. Cl. C07d 49/34
U.S. Cl. 260—309.6                15 Claims

ABSTRACT OF THE DISCLOSURE

The invention concerns a compound of the formula:

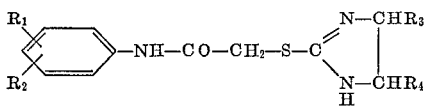

wherein $R_1$ and $R_2$ are each hydrogen, halogen or alkyl of 1 to 3 carbon atoms, and either each of $R_3$ and $R_4$ is hydrogen, or one of $R_3$ and $R_4$ is alkyl of 1 to 3 carbon atoms or hydroxy and the other is hydrogen, or a pharmaceutically acceptable acid addition salt thereof.

---

The compounds are antihypertensive agents.
The invention relates to new acetanilide derivatives.
The present invention provides a compound of Formula I,

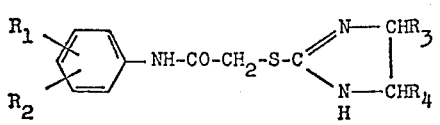

wherein $R_1$ and $R_2$ are each hydrogen, halogen or alkyl of 1 to 3 carbon atoms, and either each of $R_3$ and $R_4$ is hydrogen, or one of the substituents $R_3$ and $R_4$ is alkyl of 1 to 3 carbon atoms or hydroxy and the other substituent is hydrogen, and acid addition salts thereof.

The present invention also provides a process for the production of a compound of Formula I or an acid addition salt thereof, comprising reacting a compound of Formula II,

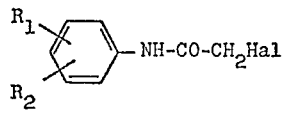

wherein $R_1$ and $R_2$ are as defined above, and
Hal is halogen, preferably chlorine or bromine, with a compound of Formula III,

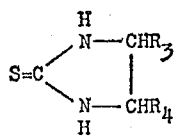

wherein $R_3$ and $R_4$ are as defined above, and where required converting the resulting compound into an acid addition salt or free base.

An acid addition salt, i.e. hydrohalic acid addition salt, results in the case of the reaction being effected in the absence of an acid-binding agent. In this case, when required, the compound of Formula I may be liberated in known manner, e.g. by treatment with sodium carbonate. When the reaction is effected in the presence of an acid-binding agent, e.g. triethylamine or sodium carbonate, a compound of Formula I may be obtained in free base form, which compound may be converted into an acid addition salt thereof when required, in known manner by treatment with an organic or inorganic acid.

The reaction of compounds of Formula II with compounds of Formula III in accordance with the invention is conveniently effected in an inert organic solvent such as acetone, dimethyl formamide or dioxane. The reaction mixture is conveniently maintained at a temperature between room temperature (25° C.) and the boil for half an hour to 48 hours, but preferably at the boil for 3 to 5 hours.

The compounds of Formula I or the acid addition salts thereof, obtained in accordance with the process of the invention, are isolated in known manner, e.g. by extraction, precipitation or salt formation, and are subsequently purified in conventional manner, e.g. by recrystallization.

The compounds of Formula I are basic, optionally crystalline compounds which are solid at room temperature and which may be converted into their acid addition salts by reaction with suitable organic or inorganic acids. Suitable organic acids for acid addition salt formation are, e.g. toluenesulphonic, acetic, malonic, succinic, malic, maleic and tartaric acid, and suitable inorganic acids are, e.g., hydrohalic acids sulphuric, nitric and phosphoric acids.

The compounds of Formula II, used as starting materials in the process of the invention, may, for example, be obtained by reacting aniline or an aniline derivative of Formula IV.

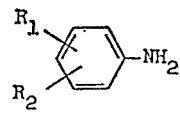

wherein $R_1$ and $R_2$ are as defined above, with a compound of Formula V,

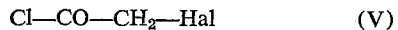

Cl—CO—CH$_2$—Hal          (V)

wherein Hal is as defined above, in the presence of an acid-binding agent.

The starting materials of Formula III are known or may be produced in conventional manner.

The compounds of Formula I and their pharmaceutically acceptable acid addition salts are useful because they possess pharmacological activity in animals. More particularly, the compounds are useful antihypertensive agents as indicated in animal tests by a lowering of the blood pressure in experimentally hypertonic rats according to the method of Grollman et al. (Arch. Exp. Phat. Pharmacol. 229, 374–388 (1957)).

For the abovementioned use, the dosage administered will, of course, vary depending upon the compound employed, mode of administration and treatment desired. However, in general, satisfactory results are obtained at a daily dosage of from about 0.1 milligrams to about 30 milligrams per kilogram animal body weight, preferably given in divided doses 2 to 3 times a day or in sustained release form. For the larger mammals, the total daily dose is from about 7 to about 70 milligrams and unit dosage forms suitable for oral administration comprise between about 2 and 35 milligrams of the compound admixed with pharmaceutical carriers or diluents.

2',6'-dichloro-2-(2-imidazolin - 2 - ylthio) - acetanilide and 2',6'-dimethyl-2(2-imidazolin-2 - ylthio) - acetanilide, as well as acid addition salts thereof, have been found to be particularly effective for the abovementioned use.

An example of a tablet composition consists of 10 mg. of 2',6'-dichloro-2-(2 - imidazolin - 2 - ylthio) - acetanilide hydrochloride, 108 mg. of lactose, 2 mg. of paraffin oil, 1 mg of gelatin, 13 mg. of maize starch and 6 mg. of talc.

In the following non-limitative examples all temperatures are indicated in degrees centigrade and are uncorrected.

EXAMPLE 1

2',6'-dimethyl-2-(2-imidazolin-2-ylthio)-acetanilide

A solution of 5.4 g. (0.053 mol) of N,N'-ethylene-thiourea and 10 g. (0.053 mol) of 2',6'-dimethyl-2-chloro-acetanilide in 200 cc. of dry acetone is heated to the boil under reflux for 3 hours. The reaction mixture is subsequently cooled and the resulting precipitate is filtered off. The filter residue is crystallized from acetone/dimethyl formamide, whereby 2',6'-dimethyl-2-(2-imidazolin-2-ylthio)-acetanilide hydrochloride is obtained in the form of small rhombic white plates having a M.P. of 196–198°. The free base is obtained by treating the hydrochloride with an aqueous sodium carbonate solution.

EXAMPLE 2

2',6'-dichloro-2-(2-imidazolin-2-ylthio)-acetanilide

A solution of 10.2 g. (0.1 mol) of N,N'-ethylene-thiourea and 23.8 g. (0.1 mol) of 2,2',6'trichloro-acetanilide in 500 cc. of dry acetone is heated to the boil under reflux for 4 hours. Approximately 200 cc. of acetone are then removed by evaporation on a rotary evaporator and the reaction mixture is subsequently filtered in order to remove the resulting white precipitate. The filter residue is first crystallized from methanol and then from water, whereby 2',6'-dichloro-2-(2 - imidazolin-2-ylthio)-acetanilide hydrochloride is obtained in the form of a white microcrystalline product having a M.P. of 198–200°.

The base liberated from the resulting hydrochloride by treatment with aqueous sodium carbonate solution has a M.P. of 134–135°.

EXAMPLE 3

2'-chloro-2-(2-imidazolin-2-ylthio)-acetanilide

A solution of 10.2 g. (0.1 mol) of N,N'-ethylene-thiourea and 20.4 g. (0.1 mol) of 2,2'-dichloro-acetanilide in 500 cc. of dry acetone is heated to the boil under reflux for 3 hours. The reaction mixture is subsequently filtered in order to remove the resulting white precipitate. The filter residue is crystallized from methanol/isopropanol, whereby 2'-chloro-2-(2 - imidazolin - 2 - ylthio)-acetanilide hydrochloride is obtained in the form of white hexagonal clusters having a M.P. of 171–172°. The free base is obtained from the hydrochloride by treatment with an aqueous sodium carbonate solution.

EXAMPLE 4

2',6'diethyl-2-(2-imidazolin-2-ylthio)-acetanilide

A solution of 10.2 g. (0.1 mol) of N,N'-ethylene-thiourea and 22.5 g. (0.1 mol) of 2',6'-diethyl-2-chloro-acetanilide in 500 cc. of dry acetone is heated to the boil under reflux for 3½ hours. The reaction mixture is subsequently filtered in order to remove the resulting white precipitate. The filter residue is crystallized from absolute ethanol, whereby 2',6'-diethyl-2-(2-imidazolin-2-ylthio)-acetanilide hydrochloride is obtained in the form of a white microcrystalline product having a M.P. of 169–173°. The free base is obtained from the hydrochloride by treatment with an aqueous sodium carbonate solution.

EXAMPLE 5

2-(2-imidazolin-2-ylthio)-4'-chloro-acetanilide

A solution of 10.2 g. (0.1 mol) of N,N'-ethylene-thiourea and 20.4 g. (0.1 mol) of 2,4'-dichloro-acetanilide in 300 cc. of dry acetone is heated to the boil under reflux for 4 hours. The reaction mixture is subsequently filtered in order to remove the resulting white precipitate. The filter residue is crystallized twice from absolute ethanol, whereby 2-(2-imidazolin-2 - ylthio) - 4' - chloro-acetanilide hydrochloride is obtained in white microcrystalline form having a M.P. of 190–193°. The free base is obtained from the hydrochloride by treatment with aqueous sodium carbonate solution.

EXAMPLE 6

2(2-imidazolin-2-ylthio)-3'-chloro-acetanilide

A solution of 10.2 g. (0.1 mol) of N,N'-ethylene-thiourea and 20.4 g. (0.1 mol) of 2,3'-dichloro-acetanilide in 400 cc. of dry acetone is heated to the boil under reflux for 3 hours. After cooling the reaction mixture, a white precipitate is obtained, which is filtered off and crystallized from methanol/diisopropyl ether. 2-(2-imidazolin-2-ylthio)-3'-chloro - acetanilide hydrochloride is obtained in the form of white needles having a M.P. of 160–164°. The free base is obtained from the hydrochloride by treatment with aqueous sodium carbonate solution.

EXAMPLE 7

2'-methyl-2-(2-imidazolin-2-ylthio)-acetanilide

A solution of 11.2 g. (0.11 mol) of N,N'-ethylenethiourea and 18.3 g. (0.1 mol) of 2'-methyl-2-chloro-acetanilide in 800 cc. of dry acetone is allowed to stand at room temperature for 48 hours. The resulting precipitate is filtered off and crystallized from methanol/diisopropyl ether while treating with charcoal. 2'-methyl-2-(2-imidazolin-2-ylthio)-acetanilide hydrochloride is obtained in the form of clusters of creamcoloured needles having a M.P. of 168–170°. The free base is obtained from the hydrochloride by treatment with aqueous sodium carbonate solution.

EXAMPLE 8

2-(2-imidazolin-2-ylthio)-acetanilide

A solution of 16.9 g. (0.1 mol) of 2-chloro-acetanilide in 100 cc. of dry acetone is added to a solution of 10.2 g. (0.1 mol) of N,N'-ethylenethiourea in 300 cc. of dry acetone. The reaction mixture is heated to the boil under reflux for 2 hours and the acetone is subsequently removed by evaporation in a vacuum. After treating the rubber-like residue with isopropanol/diisopropyl ether, the resulting white precipitate is crystalilzed from methanol/diisopropyl ether. 2-(2-imidazolin-2-ylthio)-acetanilide hydrochloride is obtained in the form of a white crystalline product having a M.P. of 86–89°. The free base is obtained from the hydrochloride by treatment with aqueous sodium carbonate solution.

EXAMPLE 9

2'-chloro-6'-methyl-2-(2-imidazolin-2-ylthio)-acetanilide

A solution of 10.2 g. (0.1 mol) of N,N'-ethylenethiourea and 21.8 g. (0.1 mol) of 2,2'-dichloro-6'-methyl-acetanilide in 500 cc. of dry acetone is heated to the boil under reflux for 3 hours. The reaction mixture is subsequently cooled and filtered in order to remove the resulting precipitate. The filter residue is crystallized from methanol/diisopropyl ether while treating with charcoal and is recrystallized from absolute ethanol. 2'-chloro-6'-methyl-2-(2-imidazolin-2-ylthio)-acetanilide hydrochloride is obtained in the form of a white microcrystalline powder having a M.P. of 157–160°. The free base is obtained from the hydrochloride by treatment with aqueous sodium carbonate solution.

EXAMPLE 10

2',5'-dichloro-2-(2-imidazolin-2-ylthio)-acetanilide

A solution of 10.2 g. (0.1 mol) of N,N'-ethylenethiourea and 23.8 g. (0.1 mol) of 2,2',5'-trichloro-acetanilide in 300 cc. of dry acetone is heated to the boil under reflux for 3 hours. The hot reaction mixture is filtered in order to remove the resulting precipitate. The filter residue is crystallized from methanol/ether, whereby 2',5'-dichloro-2-(2-imidazolin-2-ylthio)-acetanilide hydrochloride is obtained in the form of small white plates having a M.P. of 203–204°. The free base is obtained from the hydrochloride by treatment with aqueous sodium carbonate solution.

EXAMPLE 11

3',4'-dichloro-2-(2-imidazolin-2-ylthio)-acetanilide

A solution of 10.2 g. (0.1 mol) of N,N'-ethylenethiourea and 23.8 g. (0.1 mol) of 2,3',4'-trichloro-acetanilide in 300 cc. of dry acetone is heated to the boil under reflux for 3 hours. The hot reaction mixture is filtered in order to remove the resulting precipitate. The filter residue is crystallized from methanol/diisopropyl ether, whereby 3',4' - dichloro - 2 - (2-imidazolin-2-ylthio)-acetanilide hydrochloride is obtained in the form of white needles having a M.P. of 203–205°. The free base is obtained from the hydrochloride by treatment with aqueous sodium carbonate solution.

EXAMPLE 12

2',6'-difluoro-2-(2-imidazolin-2-ylthio)-acetanilide

A solution of 5.1 g. (0.05 mol) of N,N'-ethylenethiourea and 10.3 g. (0.05 mol) of 2',6'-difluoro-2-chloro-acetanilide in 200 cc. of dry acetone is heated to the boil under reflux for three hours. The hot reaction mixture is filtered in order to remove the resulting precipitate. The residue is taken up in hot acetone and is again filtered off. The filter residue is crystallized from absolute ethanol, whereby 2',6' - difluoro - 2-(2-imidazolin-2-ylthio)-acetanilide hydrochloride is obtained in the form of a white microcrystalline powder having a M.P. of 205–206°. The free base is obtained from the hydrochloride by treatment with aqueous sodium carbonate solution.

EXAMPLE 13

2',6'-dibromo-2-(2-imidazolin-2-ylthio)-acetanilide

A solution of 3.4 g. (0.033 mol) of N,N'-ethylenethiourea and 11.0 g. (0.033 mol) of 2',6'-dibromo-2-chloro-acetanilide in 300 cc. of dry acetone is heated to the boil under reflux for six hours. The hot reaction mixture is filtered in order to remove the resulting precipitate. The filter residue is crystallized from absolute ethanol, whereby 2',6'-dibromo-2-(2-imidazolin-2-ylthio)-acetanilide hydrochloride is obtained in the form of small white cubes having a M.P. of 196–200°. The free base is obtained from the hydrochloride by treatment with aqueous sodium carbonate solution.

EXAMPLE 14

2',6'-dichloro-2-(4-methyl-2-imidazolin-2-ylthio)-acetanilide

A solution of 5.8 g. (0.05 mol) of 1,2-propylenethiourea and 11.9 g. (0.05 mol) of 2,2',6'-trichloro-acetanilide in 150 cc. of dry acetone is heated to the boil under reflux for four hours. After cooling the reaction mixture the resulting precipitate is filtered off. The filter residue is crystallized from absolute ethanol while treating with charcoal, whereby 2',6'-dichloro-2-(4-methyl-2-imidazolin-2-ylthio)-acetanilide hydrochloride is obtained in the form of a white amorphous solid product having a M.P. of 190–191°. The free base is obtained from the hydrochloride by treatment with aqueous sodium carbonate solution.

What is claimed is:
1. A compound of the formula:

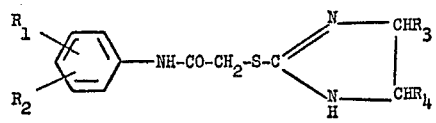

wherein
$R_1$ and $R_2$ are each hydrogen, halogen or alkyl or 1 to 3 carbon atoms, and
$R_3$ and $R_4$ are both hydrogen or
one of $R_3$ or $R_4$ is alkyl of 1 to 3 carbon atoms and the other is hydrogen.

2. The compounds of claim 1, which is 2',6'-dimethyl-2-(2-imidazolin-2-ylthio)-acetanilide.

3. The compound of claim 1, which is 2',6'-dichloro-2-(2-imidazolin-2-ylthio)-acetanilide.

4. The compound of claim 1, which is 2'-chloro-2-(2-imidazolin-2-ylthio)-acetanilide.

5. The compound of claim 1, which is 2',6'-diethyl-2-(2-imidazolin-2-ylthio)-acetanilide.

6. The compound of claim 1, which is 2-(2-imidazolin-2-ylthio)-4'-chloro-acetanilide.

7. The compound of claim 1, which is 2-(2-imidazolin-2-ylthio)-3'-chloro-acetanilide.

8. The compound of claim 1, which is 2'-methyl-2-(2-imidazolin-2-ylthio)-acetanilide.

9. The compound of claim 1, which is 2-(2-imidazolin-2-ylthio)-acetanilide.

10. The compound of claim 1, which is 2'-chloro-6'-methyl-2-(2-imidazolin-2-ylthio)-acetanilide.

11. The compound of claim 1, which is 2',5'-dichloro-2-(2-imidazolin-2-ylthio)-acetanilide.

12. The compound of claim 1, which is 3',4'-dichloro-2-(2-imidazolin-2-ylthio)-acetanilide.

13. The compounds of claim 1, which is 2',6'-difluoro-2-(2-imidazolin-2-ylthio)-acetanilide.

14. The compound of claim 1, which is 2',6'-dibromo-2-(2-imidazolin-2-ylthio)-acetanilide.

15. The compound of claim 1, which is 2',6'-dichloro-2-(4-methyl-2-imidazolin-2-ylthio)-acetanilide .

References Cited

UNITED STATES PATENTS

| 2,813,102 | 11/1957 | Winthrop | 260—309.6 |
| 2,833,781 | 5/1958 | Haas | 260—209.6 |
| 3,190,887 | 6/1965 | Hensley et al. | 260—309.6 |
| 3,251,854 | 5/1966 | Sims | 260—309.6 |
| 3,488,423 | 1/1970 | Doebel et al. | 260—309.6 |
| 3,551,417 | 12/1970 | Lombard et al. | 260—309.6 |

OTHER REFERENCES

Kvitko et al.: Index Chemicus, vol. 35, No. 8, Abstract 122,643 (1969).

Jasinskas et al.: Chem. Abst., vol. 73, No. 109754G (1970).

NATALIE TROUSOF, Primary Examiner

U.S. Cl. X.R.

260—309.7, 562 B; 424—273